(12) United States Patent
Habermehl (10) Patent No.: US 9,560,139 B2
(45) Date of Patent: Jan. 31, 2017

(54) TRAIN COMMUNICATION NETWORK (71) Applicants: Electro-Motive Diesel, Inc., LaGrange, IL (US); Secure Communications Systems Inc., Santa Ana, CA (US)

(72) Inventor: Neil Keith Habermehl, Irvine, CA (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 211 days.

(21) Appl. No.: 14/250,613

(22) Filed: Apr. 11, 2014

(65) Prior Publication Data
US 2015/0291189 A1 Oct. 15, 2015

(51) Int. Cl.
B61L 15/00 (2006.01)
H04L 29/08 (2006.01)

(52) U.S. Cl.
CPC .......... *H04L 67/12* (2013.01); *B61L 15/0036* (2013.01); *B61L 15/0027* (2013.01)

(58) Field of Classification Search
CPC ... B61L 15/00; B61L 15/0018; B61L 15/0036; B61L 15/0063; B61L 15/0072
USPC .............. 246/167 R, 174, 182 R, 183–187 R
See application file for complete search history.

(56) References Cited

U.S. PATENT DOCUMENTS

| | | |
|---|---|---|
| 3,093,802 A | 6/1963 | Chow |
| 4,012,603 A | 3/1977 | Araseki et al. |
| 4,383,243 A | 5/1983 | Kruegel et al. |
| 4,556,866 A | 12/1985 | Gorecki |
| 4,578,818 A | 3/1986 | Claydon |
| 4,721,923 A | 1/1988 | Bares et al. |
| 4,724,396 A | 2/1988 | Taylor, Jr. et al. |
| 4,815,106 A | 3/1989 | Propp et al. |
| 4,860,308 A | 8/1989 | Kamerman et al. |
| 5,351,272 A | 9/1994 | Abraham |
| 5,420,883 A | 5/1995 | Swensen et al. |
| 5,446,918 A | 8/1995 | Lamy |
| 5,651,517 A | 7/1997 | Stevens et al. |
| 5,706,191 A | 1/1998 | Bassett et al. |
| 5,717,685 A | 2/1998 | Abraham |

(Continued)

FOREIGN PATENT DOCUMENTS

| | | |
|---|---|---|
| DE | 421 4821 | 11/1992 |
| DE | 195 01 887 | 7/1995 |

(Continued)

OTHER PUBLICATIONS

Neil Keith Habermehl, U.S. Patent Application entitled "Train Communication System" filed on Apr. 11, 2014.

(Continued)

*Primary Examiner* — R. J. McCarry, Jr.
(74) *Attorney, Agent, or Firm* — Finnegan, Henderson, Farabow, Garrett & Dunner, LLP (57) ABSTRACT

An access point for a communication network is disclosed. The access point may have a communications processor configured to receive signals from a different access point of the communication network, and at least a first attenuator configured to selectively attenuate the signals before they are received by the communications processor. The access point may also have a voltage clamp configured to limit a strength of the signals before they are received by the at least a first attenuator, and a second attenuator configured to attenuate all signals before they are received by the voltage clamp.

20 Claims, 4 Drawing Sheets

(56) References Cited

U.S. PATENT DOCUMENTS

| | | |
|---|---|---|
| 5,777,545 A | 7/1998 | Patel et al. |
| 5,777,547 A | 7/1998 | Waldrop |
| 5,818,127 A | 10/1998 | Abraham |
| 5,969,643 A | 10/1999 | Curtis |
| 5,986,577 A | 11/1999 | Bezos |
| 6,114,974 A | 9/2000 | Halvorson |
| 6,163,089 A | 12/2000 | Kull |
| 6,311,045 B1 | 10/2001 | Domokos |
| 6,373,375 B1 | 4/2002 | Hoetzel et al. |
| 6,392,368 B1 | 5/2002 | Deller et al. |
| 6,392,562 B1 | 5/2002 | Boston et al. |
| 6,408,766 B1 | 6/2002 | McLaughlin et al. |
| 6,421,587 B2 | 7/2002 | Diana et al. |
| 6,442,195 B1 | 8/2002 | Liu et al. |
| 6,490,523 B2 | 12/2002 | Doner |
| 6,553,838 B2 | 4/2003 | Amini |
| 6,567,648 B1 | 5/2003 | Ahn et al. |
| 6,587,739 B1 | 7/2003 | Abrams et al. |
| 6,595,045 B1 | 7/2003 | Fuglewicz et al. |
| 6,972,670 B2 | 12/2005 | LaDuc et al. |
| 6,995,658 B2 | 2/2006 | Tustison et al. |
| 7,006,523 B2 | 2/2006 | Binder |
| 7,021,588 B2 | 4/2006 | Hess, Jr. et al. |
| 7,113,752 B2 | 9/2006 | Leinonen et al. |
| 7,182,411 B2 | 2/2007 | Levy et al. |
| 7,206,320 B2 | 4/2007 | Iwamura |
| 7,336,156 B2 | 2/2008 | Arita et al. |
| 7,499,682 B2 | 3/2009 | Rozenblit et al. |
| 7,634,240 B2 | 12/2009 | Mitzlaff et al. |
| 7,893,557 B2 | 2/2011 | Davis et al. |
| 7,933,420 B2 | 4/2011 | Copley et al. |
| 8,036,402 B2 | 10/2011 | Furge |
| 8,068,616 B2 | 11/2011 | Copley et al. |
| 8,140,027 B2 | 3/2012 | Ozgun et al. |
| 8,160,520 B2 | 4/2012 | Srinivasan et al. |
| 8,232,666 B2 | 7/2012 | Rocamora et al. |
| 8,305,229 B1 | 11/2012 | Gard |
| 8,306,489 B2 | 11/2012 | Schwarzmueller et al. |
| 8,340,318 B2 | 12/2012 | Copley et al. |
| 8,364,189 B2 | 1/2013 | Mintah et al. |
| 8,447,255 B2 | 5/2013 | Asokan |
| 2002/0011923 A1 | 1/2002 | Cunningham et al. |
| 2002/0101882 A1 | 8/2002 | Kim |
| 2002/0167398 A1 | 11/2002 | Strasser |
| 2003/0195668 A1 | 10/2003 | Radtke et al. |
| 2004/0223275 A1 | 11/2004 | Yanagida et al. |
| 2004/0261101 A1 | 12/2004 | Iwamura |
| 2005/0013320 A1 | 1/2005 | Binder |
| 2005/0085259 A1 | 4/2005 | Conner et al. |
| 2005/0143868 A1 | 6/2005 | Whelan |
| 2006/0025903 A1 | 2/2006 | Kumar |
| 2006/0170285 A1 | 8/2006 | Morimitsu et al. |
| 2007/0136050 A1 | 6/2007 | Tourwe |
| 2007/0282494 A1 | 12/2007 | Moffitt et al. |
| 2007/0286079 A1 | 12/2007 | Mollenkopf et al. |
| 2008/0003962 A1 | 1/2008 | Ngai |
| 2008/0195259 A1 | 8/2008 | Davis et al. |
| 2008/0211663 A1 | 9/2008 | Mansfield et al. |
| 2008/0298384 A1 | 12/2008 | Beaucage |
| 2009/0042436 A1 | 2/2009 | Emoto et al. |
| 2009/0287496 A1 | 11/2009 | Thyssen et al. |
| 2010/0045447 A1 | 2/2010 | Mollenkopf et al. |
| 2010/0235022 A1 | 9/2010 | Siddappa et al. |
| 2010/0241295 A1 | 9/2010 | Cooper et al. |
| 2010/0256842 A1 | 10/2010 | Liberatore |
| 2011/0093144 A1 | 4/2011 | Goodermuth et al. |
| 2012/0095580 A1 | 4/2012 | Zhang |
| 2012/0163201 A1* | 6/2012 | Williams ............ H04N 7/102 370/252 |
| 2013/0038424 A1 | 2/2013 | Katar et al. |
| 2013/0077801 A1 | 3/2013 | Tarnowski |
| 2013/0158848 A1* | 6/2013 | Gallagher ............ F02D 41/021 701/123 |
| 2013/0320154 A1 | 12/2013 | Brown |
| 2013/0323939 A1 | 12/2013 | Brown |

FOREIGN PATENT DOCUMENTS

| | | |
|---|---|---|
| DE | 100 44 088 | 4/2002 |
| DE | 202007008825 | 8/2007 |
| EP | 0 968 897 | 1/2000 |
| EP | 1 010 602 | 6/2000 |
| EP | 1 065 127 | 1/2001 |
| EP | 1 253 725 | 10/2002 |
| EP | 1 306 283 | 5/2003 |
| EP | 1 487 128 | 12/2004 |
| GB | 109 7125 | 12/1967 |
| GB | 2 450 520 | 12/2008 |
| JP | 07/508609 | 9/1995 |
| JP | 11/317697 | 11/1999 |
| JP | 2004/235752 | 8/2004 |
| JP | 2004/241997 | 6/2005 |
| JP | 2005/176131 | 6/2005 |
| WO | WO 94/01949 | 1/1994 |
| WO | WO 2004/054224 | 6/2004 |
| WO | WO 2006/075767 A3 | 7/2006 |

OTHER PUBLICATIONS

Neil Keith Habermehl., U.S. Patent Application entitled "Train Communication System" filed on Apr. 11, 2014.

Amirshahi, Pouyan, et al., "High-Frequency Characteristics of Overhead Multiconductor Power Lines for Broadband Communications," IEEE Journal on Selected Areas in Communications, vol. 24, No. 7, Jul. 2006, p. 1292.

Carcelle, Xavier, "Power Line Communications In Practice," Hybrid PLC (2009), p. 304.

Dai, Huaiyu, et al., "Advanced Signal Processing for Power Line Communications," *IEEE Communications Magazine*, May 2003, p. 100.

Hailes, S., "Modern telecommunications systems for train control," The 11$^{th}$ IET Professional Development Course on Railway Signalling and Control Systems, Jun. 2006, pp. 185-192.

IEEE Standard for Communications Protocol Aboard Trains, IEEE Std 1473-1999.

Kamata, Keiichi, "T-Ethernet: The Next International Standard Candidate for Train Communication Network." 2008.

Kirrmann, Hubert, et al., "The IEC/IEEE Train Communication Network," IEEE (2001).

Latchman, Haniph A., et al., "Homeplug AV and IEEE 1901: A Handbook for PLC Designers and Users," IEEE Press, p. 316.

Liu, Er, et al., "Broadband Powerline Channel and Capacity Analysis," IEEE (2005) p. 7.

Liu, Er, et al., "Powerline Communication Over Special Systems," IEEE (2005), p. 167.

"Nexans signaling cable enchances," *Railway Gazette International*; Apr. 2006; 162, 4; ProQuest, p. 206.

PM4380 Analog Front End for VDSL2/ADSL2+, Preliminary Product Brief, PMC-2060187, Issue 3, PMC-Sierra, Inc. (2007).

Roden, Andrew, "Duotrack signals S&T cabling revolution," *International Railway Journal*; Jul. 2007; 47, 7; ABI/INFORM Complete, p. 38.

Russo, D., et al., "A New Approach for Train Passenger Information Systems," presented at WCRR 2008 Seoul Korea, May 18-22, 2008.

Swanson, John D., "Advanced Light Rail Vehicle Communication Systems Design," Proceedings of the 2004 ASME/IEEE Joint Rail Conference, Apr. 6-8, 2004, p. 213.

Trainline communications—trainline communication system specifications—Vehicle Track Systems Newletter, *Railway Age*, Dec. 1994.

U.S. Appl. No. 13/563,220 by Aaron Gamache Foege et al., filed Jul. 31, 2012, entitled "Fuel Distribution System for Multi-Locomotive Consist".

U.S. Appl. No. 13/690,239 by James Robery Luecke et al., filed on Nov. 30, 2012, entitled "Data Communication Systems and Methods for Locomotive Consists".

U.S. Appl. No. 13/903,367 by Tom Otsubo et al., filed May 24, 2013, entitled "Communication System for Use with Train Consist".

(56) References Cited

OTHER PUBLICATIONS

U.S. Appl. No. 13/903,395 by Tom Otsubo et al., filed May 24, 2013 entitled "Locomotive/Tender Car Communication System".

* cited by examiner

TRAIN COMMUNICATION NETWORK

TECHNICAL FIELD

The present disclosure relates generally to a communication network, and more particularly, to a communication network for a train.

BACKGROUND

A consist includes one or more locomotives that are coupled together to produce motive power for a train of rail vehicles. The locomotives each include one or more engines, which combust fuel to produce mechanical power. The engine(s) of each locomotive can be supplied with liquid fuel (e.g., diesel fuel) from an onboard tank, gaseous fuel (e.g., natural gas) from a tender car, or a blend of the liquid and gaseous fuels. The mechanical power produced by the combustion process is directed through a generator and used to generate electricity. The electricity is then routed to traction motors of the locomotives, thereby generating torque that propels the train. The locomotives can be connected together at the front of the train or separated and located at different positions along the train. For example, the consist can be positioned at the front, middle, or end of the train. In some instances, more than one consist can be included within a single train. In some consists, the locomotives include computer systems for maintaining operations of the locomotive.

Because the locomotives of a consist must cooperate to propel the train, communication between the locomotives can be important. Historically, this communication has been facilitated through the use of an MU (Multi-Unit) cable that extends along the length of the consist. An MU cable is comprised of many different wires, each capable of carrying a discrete signal used to regulate a different aspect of consist operation. For example, a lead locomotive generates current within a particular one of the wires to indicate a power level setting requested by the train operator. When this wire is energized, the engines of all trailing locomotives are caused to operate at a specific throttle value. In another example, when one locomotive experiences a fault condition, another of the wires is energized to alert the other locomotives of the condition's existence.

In some consists, locomotives communicate via their respective computer systems on an Ethernet network formed over the MU cables, or other intra-consist electrical cables. With this configuration, network data can be transmitted from the computer system in the lead locomotive to the computer systems in the trail locomotives, and vice-versa. The network data includes data that is packaged as data packets and uniquely addressed to particular computer systems, or portions of the computer systems. The network data can be, for example, vehicle sensor data indicative of vehicle health, commodity condition data, temperature data, weight data, and security data. The network data is transmitted orthogonal to conventional non-network (i.e., command) data that is already being transmitted on the MU cable.

Traditionally, communication over a MU cable or other intra-locomotive cable was limited to voltage levels for individual wires within the MU cable. For example, a high voltage applied to an individual wire might indicate one value, while a low or zero voltage applied to the individual wire might indicate a second value. While MU cables provide an existing infrastructure that can be used by the computer systems of locomotives to communicate network data, MU cables were not designed for network data communication. For example, the wires within a MU cable are not shielded or twisted and are subject to interference. As a result, signal strength can degrade significantly as the signal propagates the length of a MU cable. For example, in a locomotive consist, the locomotive computer system adjacent to the signal's origin might receive the signal at 10 dBm, a locomotive further away in the consist might receive the signal at −30 dBm, which may be too weak to effectively transmit network data.

The signal degradation can be overcome by increasing strength of the signal when it is transmitted. While increasing the transmit signal allows for adequate signal strength to reach locomotive computer systems far away from the origin of the signal, it can overload the components of locomotive computer systems that are located close to the origin of the signal. For example, increasing the signal strength might produce a received 10 dBm signal at a locomotive further away from the origin of the signal, but might overload a locomotive computer system close to the origin of the signal with a 20 dBm signal.

Thus, one solution for overcoming signal degradation is to increase the strength of the transmit signal, but attenuate the signal on the receive end so as to not overload computer systems receiving the signal. Such a solution is described in U.S. Patent Publication No. 2012/0163201 (the '201 publication) filed by Williams et al. and published on Jun. 28, 2012. The '201 publication describes a cable modem auto-attenuation system capable of taking a high-power signal from the cable plant's service line, dropping the power value down to a usable level and transmitting the signal to a cable modem. Although the system of the '201 publication may minimally solve the problem of overcoming signal degradation over cable, the system would not be adequate for a train communication network because it is not adapted to interface with train communication hardware and does not provide the granularity of attenuation control needed for train communication networks.

The disclosed communication network is directed to overcoming one or more of the problems set forth above.

SUMMARY

In one aspect, the present disclosure is directed to an access point for a communication network. The access point may include a communications processor configured to receive signals from a different access point of the communication network, and at least a first attenuator configured to selectively attenuate the signals before they are received by the communications processor. The access point may also include a voltage clamp configured to limit a strength of the signals before they are received by the at least a first attenuator, and a second attenuator configured to attenuate all signals before they are received by the voltage clamp.

In another aspect, the present disclosure is directed to a communication network. The communication network may include a first access point having a first communications processor, at least a first attenuator, a first voltage clamp, and a second attenuator. The communication network may also include a second access point having a second communications processor, at least a third attenuator, a second voltage clamp, and a fourth attenuator. The communication network may further include a cable connecting the first and second access points. The at least a first attenuator and the at least a third attenuator are connected to the cable at locations between the first and second communications processors. The first and second voltage clamps are connected to the cable at locations between the at least a first and at least a third attenuators. The second and fourth attenuators are connected to the cable at locations between the at least a first and at least a third attenuators.

DETAILED DESCRIPTION

Figure 1:
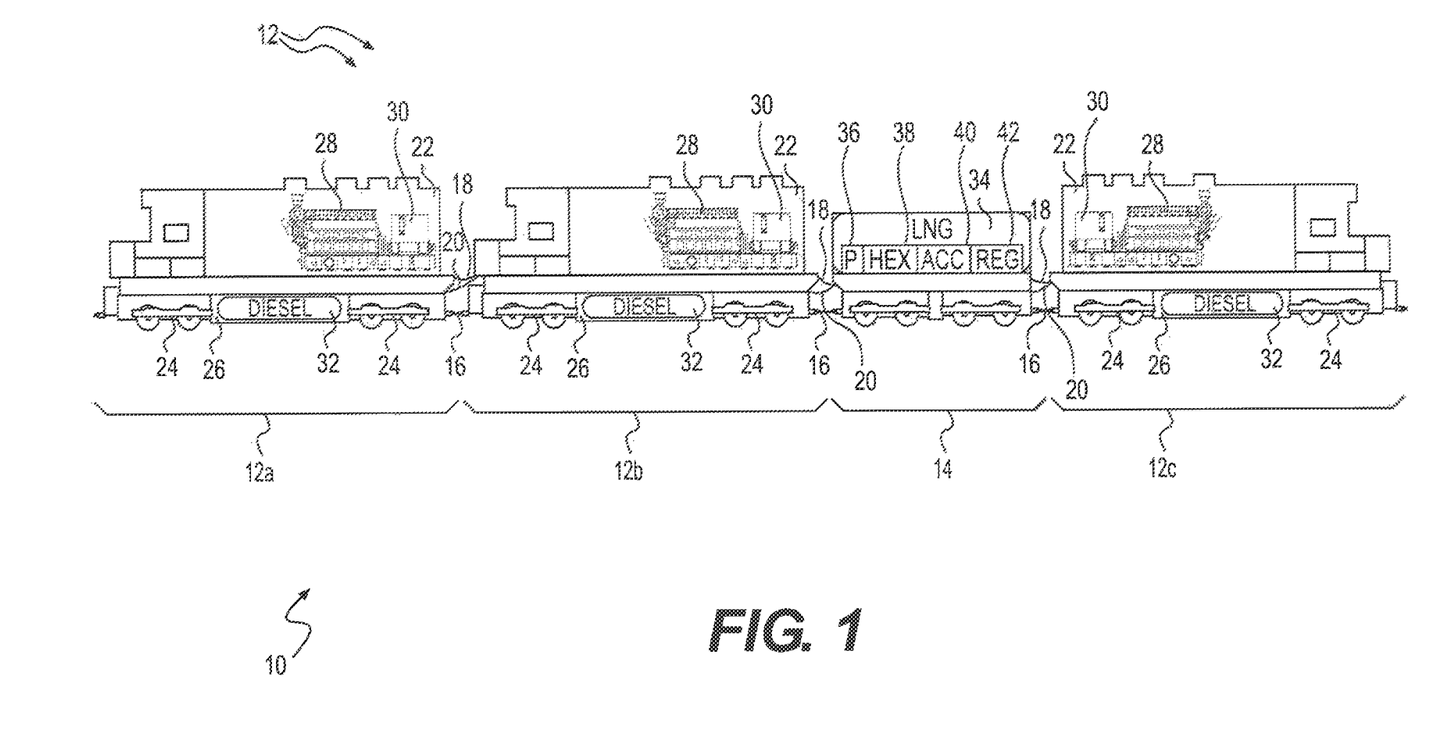
FIG. 1 is a pictorial illustration of an exemplary disclosed consist.

FIG. 1 illustrates an exemplary train consist 10 having one or more locomotives 12 and a tender car 14. In the disclosed embodiment, consist 10 has three different locomotives 12, including a lead locomotive 12a located ahead of tender car 14 and two trailing locomotives 12b, 12c located behind tender car 14. It is contemplated, however, that consist 10 may include any number of locomotives 12 and/or tender cars, and that locomotives 12 may be located in any arrangement relative to tender car(s) 14 and in any orientation (e.g., forward-facing or rear-facing). Consist 10 may be located at the front of a train of other rail vehicles (not shown), within the train of rail vehicles, or at the end of the train of rail vehicles. It is also contemplated that more than one consist 10 may be included within a single train of rail vehicles, if desired, and/or that consist 10 may travel at times without a train of other rail vehicles.

Each locomotive 12 may be connected to an adjacent locomotive 12 and/or tender car 14 in several different ways. For example, locomotives 12 and tender car 14 may be connected to each other via a mechanical coupling 16, one or more fluid couplings 18, and one or more electrical couplings 20. Mechanical coupling 16 may be configured to transmit tractive and braking forces between locomotives 12 and tender car 14. Fluid couplings 18 may be configured to transmit fluids (e.g., fuel, coolant, lubricant, pressurized air, etc.) between locomotives 12 and tender car 14. Electrical couplings 20 may be configured to transmit power and/or data (e.g., data in the form of electrical signals) between locomotives 12 and tender car 14. In one example, electrical couplings 20 include an MU cable configured to transmit conventional command signals and/or electrical power. In another example, electrical couplings 20 include a dedicated data link configured to transmit packets of data (e.g., Ethernet data), as will be discussed in more detail below. In yet another example, the data packets may be transmitted via the MU cable. It is also contemplated that some data may be transmitted between locomotives 12 and tender car 14 via a combination of the MU cable, the dedicated data link, and/or other means (e.g., wirelessly), if desired.

Each locomotive 12 may include a car body 22 supported at opposing ends by a plurality of trucks 24 (e.g., two trucks 24). Each truck 24 may be configured to engage a track (not shown) via a plurality of wheels, and to support a frame 26 of car body 22. Any number of engines 28 may be mounted to frame 26 within car body 22 and drivingly connected to a generator 30 to produce electricity that propels the wheels of each truck 24. Engines 28 may be internal combustion engines configured to combust a mixture of air and fuel. The fuel may include a liquid fuel (e.g., diesel) provided to engines 28 from a tank 32 located onboard each locomotive 12, a gaseous fuel (e.g., natural gas) provided by tender car 14 via fluid couplings 18, and/or a blended mixture of the liquid and gaseous fuels.

Tender car 14, like locomotives 12, may also be equipped with a frame 26 that is supported by two or more trucks 24. Tender car 14 may also include one or more tanks 34 mounted to its frame 26 that are configured to store liquefied gaseous fuel (e.g., liquefied natural gas or LNG). The liquefied gaseous fuel may be gasified and then fed in series or parallel to all locomotives 12 of consist 10 for combustion within engines 28. In the disclosed embodiment, a single insulated tank 34 is used to store the liquefied gaseous fuel at low temperatures, such as below about −160° C. In some embodiments, tank 34 may be integral with frame 26 of tender car 14.

Additional fuel delivery components may be associated with tender car 14 and used to gasify and/or transport the fuel from tender car 14 to locomotives 12. These components may include, among other things, one or more fuel pumps 36, one or more heat exchangers 38, one or more accumulators 40, one or more regulators 42, and associated conduits (not shown) that condition, pressurize or otherwise move fuel, as is known in the art.

Pump(s) 36 may be situated near or within tank 34, and embody, for example, cryogenic pumps, piston pumps, centrifugal pumps, or any other pumps that are known in the industry. Pumps 36 may primarily be powered with electricity supplied via couplings 20 from generators 30 located onboard locomotives 12 (e.g., onboard lead locomotive 12a). Additionally or alternatively, pumps 36 may be powered by an electric storage system and/or an onboard auxiliary engine (not shown), if desired. Pumps 36 may pressurize the liquefied gaseous fuel to a desired operating pressure and push the fuel through heat exchanger(s) 38 to accumulator(s) 40. Heat exchanger(s) 38 may provide heat sufficient to gasify the fuel as it moves therethrough. Upon vaporization, the fuel may be transported to and stored within accumulator(s) 40. Although shown as being located onboard only tender car 14, it is contemplated that some or all of accumulator(s) 40 could alternatively be located onboard each locomotive 12. Gaseous fuel may be directed to engines 28 via regulator(s) 42.

Figure 2:
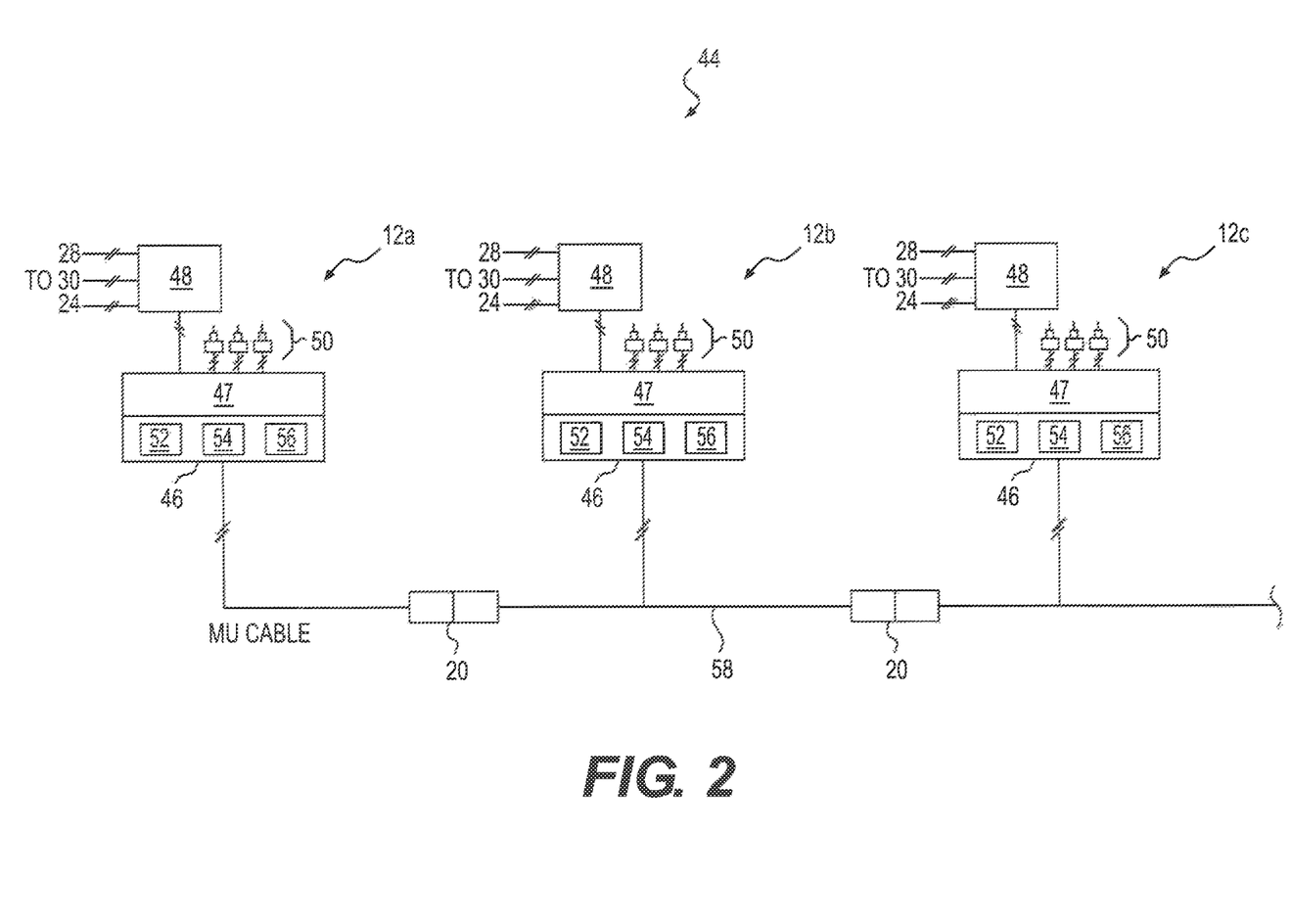
FIG. 2 is a diagrammatic illustration of an exemplary disclosed communication system that may be used in conjunction with the consist of FIG. 1.

As shown in FIG. 2, consist 10 may be equipped with a communication system 44 that facilitates coordinated control of locomotives 12 and/or tender car 14. Communication system 44 may include, among other things, an access point 46 for each locomotive 12 and for tender car 14. Each access point 46 may be connected to one or more wired and/or wireless networks, and used to communicate command signals and/or data between controllers 48 of each rail vehicle and various other network components (e.g., sensor, valves, pumps, heat exchangers, accumulators, regulators, actuators, engines, generators, etc.) 50 that are used to control locomotives 12 and/or tender car 14. Access points 46 may be connected to each other via electrical couplings 20 (e.g., via the MU cable, via the dedicated data link, and/or wirelessly). Access points 46 can be connected to a local area network hub ("LAN hub") 47 that facilitates communication between the controllers 48, the network components 50, and access points 46.

Each access point 46 can include an intra-consist router ("IC router") 52, an Ethernet bridge 54, and an MU modem 56, as well as conventional computing components known in the art (not shown) such as a processor, input/output (I/O)

ports, a storage, a memory. The I/O ports may facilitate communication between the associated access point 46 and the LAN hub 47. In some embodiments, the I/O ports may facilitate communication between the associated access point 46 and one or more of network components 50.

Likewise, IC router 52 can facilitate communication between different access points 46 of locomotives 12 that are connected to each other via electrical couplings 20. In some embodiments, IC router 52 can provide a proxy IP address corresponding to controllers 48 and network components 50 of remote locomotives. For example, IC router 52 can provide a proxy IP address for each of network components 50 of locomotive 12b, so that controller 48 of locomotive 12a can communicate with it. The IC router 52 can include, or be connected to, the corresponding Ethernet bridge 54 configured to translate network data to an electrical signal capable of being sent through an intra-consist electrical cable 58 within electronic coupling 20. Ethernet bridge 54 can include or be connected to MU modem 56. MU modem 56 can be configured to modulate a carrier signal sent over intra-consist electrical cable 58 with the electrical signal received from Ethernet bridge 54 to transmit network data between access points 46. MU modem 56 can also be configured to demodulate signals received from access points 46 and send the demodulated signals to Ethernet bridge 54 for conversion to network data destined to controller 48 or network components 50. In some embodiments, MU modem 56 sends network data orthogonal to data traditionally transmitted over intra-consist electrical cable 58 (e.g., control data). Although FIG. 2 illustrates IC router 52, Ethernet bridge 54, and MU modem 56 as separate components, in some embodiments, one component could alternatively perform the functionality of two or more components. For example, Ethernet bridge 54 may perform the operations described above with respect to IC router 52, or Ethernet bridge 54 can include, or perform the operations of, MU modem 56.

In some embodiments, access point 46, IC router 52, Ethernet bridge 54, and/or MU modem 56 can include a processor, storage, and/or memory (not shown). The processor can include one or more processing devices, such as microprocessors and/or embedded controllers. The storage can include volatile or non-volatile, magnetic, semiconductor, tape, optical, removable, non-removable, or other type of computer-readable medium or computer-readable storage device. The storage can be configured to store programs and/or other information that can be used to implement one or more of the processes discussed below. The memory can include one or more storage devices configured to store information.

Each controller 48 can be configured to control operational aspects of its related rail vehicle. For example, controller 48 of lead locomotive 12a can be configured to control operational aspects of its corresponding engine 28, generator 30, traction motors, operator displays, and other associated components. Likewise, the controllers 48 of trail locomotives 12b and 12c can be configured to control operational aspects of their corresponding engines 28, generators 30, traction motors, operator displays, and other associated components. In some embodiments, controller 48 of lead locomotive can be further configured to control operational aspects of trail locomotives 12b and/or 12c, if desired. For example, controller 48 of lead locomotive 12a can send commands through its access point 46 to the access points of trail locomotives 12b and 12c. Controller 48 of tender car 14 may be configured to control operational aspects of pump(s) 36, heat exchanger(s) 38, accumulator(s) 40, regulator(s) 42, and other associated tender car components.

Each controller 48 can embody a single microprocessor or multiple microprocessors that include a means for controlling an operation of the associated rail vehicle based on information obtained from any number of network components 50 and/or communications received via access points 46. Numerous commercially available microprocessors can be configured to perform the functions of controller 48. Controller 48 can include a memory, a secondary storage device, a processor, and any other components for running an application. Various other circuits may be associated with controller 48 such as power supply circuitry, signal conditioning circuitry, solenoid driver circuitry, and other types of circuitry.

The information obtained by a particular controller 48 via access points 46 and/or network components 50 can include performance related data associated with operations of each locomotive 12 and/or tender car 14 ("operational information"). For example, the operational information can include engine related parameters (e.g., speeds, temperatures, pressures, flow rates, etc.), generator related parameters (e.g., speeds, temperatures, voltages, currents, etc.), operator related parameters (e.g., desired speeds, desired fuel settings, locations, destinations, braking, etc.), liquid fuel related parameters (e.g., temperatures, consumption rates, fuel levels, demand, etc.), gaseous fuel related parameters (e.g., temperatures, supply rates, fuel levels, etc.), and other parameters known in the art.

The information obtained by a particular controller 48 via access points 46 and/or network components 50 can also include identification data of the other rail vehicles within the same consist 10. For example, each controller 48 can include stored in its memory the identification of the particular rail vehicle with which controller 48 is associated. The identification data can include, among other things, a type of rail vehicle (e.g., make, model, and unique identification number), physical attributes of the associated rail vehicle (e.g., size, load limit, volume, power output, power requirements, fuel consumption rate, fuel supply capacity, etc.), and maintenance information (e.g., maintenance history, time until next scheduled maintenance, usage history, etc.). When coupled with other rail vehicles within a particular consist 10, each controller 48 can be configured to communicate the identification data to the other controllers 48 within the same consist 10. Each controller 48, can also be configured to selectively affect operation of its own rail vehicle based on the obtained identification data associated with the other rail vehicles of consist 10.

In some embodiments, controllers 48 can be configured to affect operation of their associated rail vehicles based on the information obtained via access points 46 and/or network components 50 and one or more maps stored in memory. Each of these maps may include a collection of data in the form of tables, graphs, and/or equations.

According to some embodiments, access point 46 can include one or more components for adjusting a strength of signals received on intra-consist electrical cable 58. The strength of signals received on intra-consist electrical cable 58 can be important to preserving the integrity of communication system 44, while also reliably communicating network data. For example, controller 48 of lead locomotive 12a may transmit a signal over intra-consist electrical cable 58 communicating network data and, when the signal reaches access point 46 of locomotive 12b, it may be sufficiently strong to communicate the network data. But when the same signal reaches access point 46 of locomotive 12c (which is further away), the signal may have degraded to an unacceptable level. To help ensure that access point 46 of locomotive 12c also reliably receives the signal, access point 46 of locomotive 12a can increase the transmission strength of the signal.

In some embodiments, the increase in transmission strength is global to all signals originating from access point 46 of locomotive 12a. As a result, while access point 46 of locomotive 12c receives a signal of sufficient strength, access point 46 of locomotive 12b may receive a signal that is too strong, potentially degrading the signal's integrity and data throughput performance, resulting in reduced bandwidth or, in some cases, complete interruption of communication. By configuring the access points 46 of consist 10 to attenuate receive signals, access point 46 of locomotive 12a may be able to send signals via intra-consist electrical cable 58 at a high signal level to accommodate access point 46 of locomotive 12c, while not overloading access point 46 of locomotive 12b.

Figure 3:
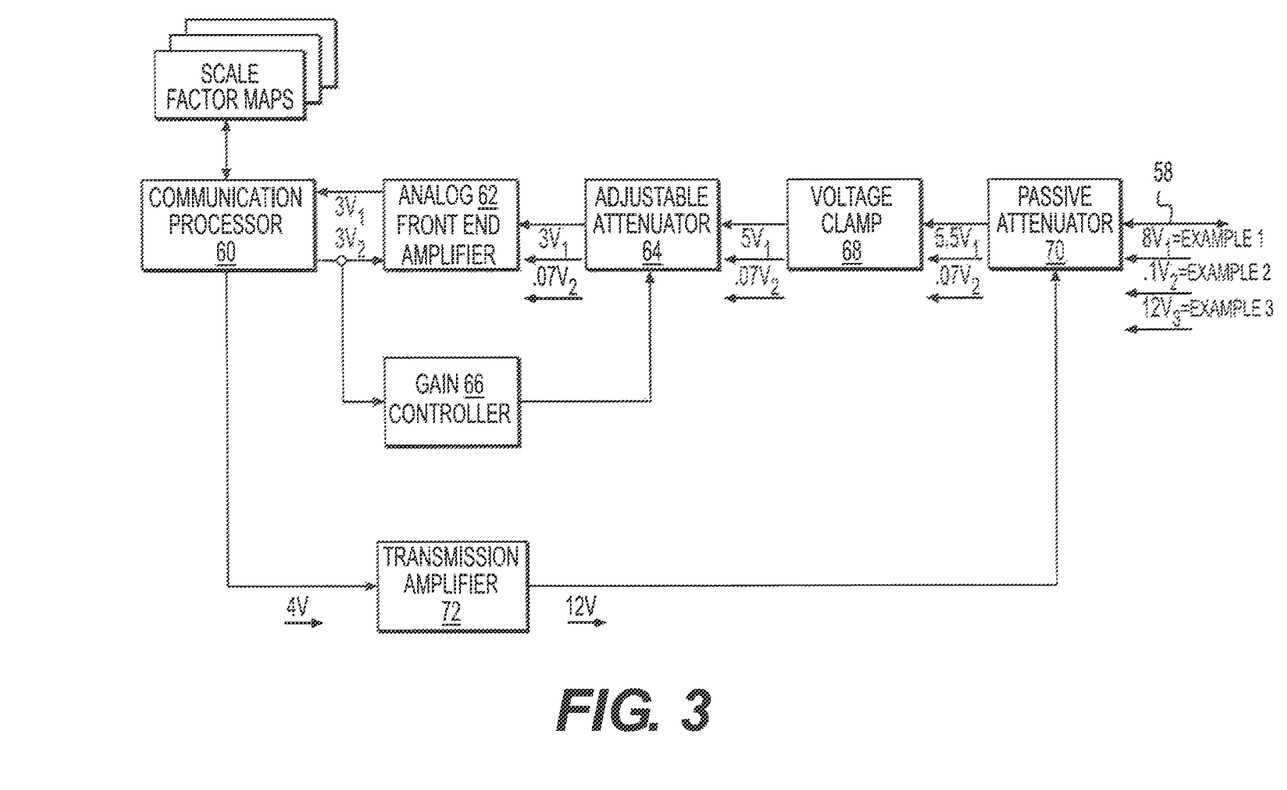
FIG. 3 is a diagrammatic illustration of an exemplary system for receive and transmit attenuation for use with the communication system of FIG. 2.

FIG. 3 is an illustration of an exemplary portion of each access point 46. In some embodiments, access point 46 can include a motherboard with one or more expansion slots for accepting daughter-cards to enhance the functionality of access point 46, and the operation of one or more of the components in FIG. 3 can be embodied within one or more of the daughter-cards. In other embodiments, one or more of the components of FIG. 3 can be permanently mounted within a single motherboard. In either situation, access point 46 may include, among other things, a communications processor 60, an analog front end amplifier ("amplifier") 62, an adjustable attenuator 64, a gain controller 66, one or more voltage clamps 68, a passive attenuator 70, and a transmission amplifier 72. It is also contemplated that communications processor 60 (or any of the other components) could be a stand alone component of access point 46 or, alternatively, included within Ethernet bridge 54.

The components of access point 46 shown in FIG. 3 can be connected by one or more signal paths that are configured to transmit digital and/or analog signals. For example, passive attenuator 70 may be located to receive signals via intra-consist cable 58, first before any other components shown in FIG. 3. Thereafter, the signals may be directed through voltage clamp 68, adjustable attenuator 64, and analog front end amplifier 62 before reaching communications processor 60. Communications processor 60 may direct control signals to amplifier 62 and gain controller 66 in parallel. Communications processor 60 may also generate signals directed back onto intra-consist cable 58 for use by other access points 46, by way of transmission amplifier 72.

Communications processor 60 may be configured to receive incoming modulated signals containing network data. Amplifier 62 may receive the incoming signals and amplify or attenuate these signals to a desired level before they are received by communications processor 60. Communications processor 60 can control the amplification or attenuation that amplifier 62 provides by sending signals to it via gain controller 66. For example, when communications processor 60 receives a signal that is too strong, it can send a signal to request that amplifier 62 attenuate the next incoming signal. And when communications processor 60 receives a signal that is too weak, it can send a signal to request that amplifier 62 amplify the next signal. In this manner, communications processor 60 may receive signals that are most conducive to proper interpretation and accurate processing.

In some instances, while amplifier 62 can provide some attenuation of the signals directed to communications processor 60, the attenuation may not always be sufficient. For example, in a consists with a large number of locomotives 12, signal strength needs to be very high so that the signals can traverse intra-consist electrical cables 58 and still be of sufficient strength at either end of consist 10. Amplifier 62, alone, may not provide sufficient attenuation to accommodate the strength of the signals for access points 46 of locomotives 12 that are adjacent or close to each other within the consist 10. Also, in some conventional embodiments, amplifier 62 can be embodied within the same component as communications processor 60 (e.g., Ethernet bridge 54), can be difficult or expensive to replace, and/or perform functions with legacy hardware that may make amplifier 62 impractical to replace. In these situations, it may be desirable to protect amplifier 62 from high-strength signals that could damage amplifier 62 and necessitate its replacement. Accordingly, it may be helpful to provide additional attenuation upstream of amplifier 62.

The additional attenuation may be provided by way of adjustable attenuator 64. Adjustable attenuator 64 can be configured to receive incoming signals, attenuate the incoming signals, and send the attenuated incoming signals to amplifier 62. Adjustable attenuator 64 can include circuitry that is capable of variably attenuating a signal. In some embodiments, adjustable attenuator 64 includes inputs allowing for external control. Adjustable attenuator 64 can be controlled digitally (e.g., by receiving a bit stream of data corresponding to the attenuation level to apply), and/or it can be controlled with an analog signal (e.g., a voltage or current corresponding to the attenuation level to apply).

In some embodiments, adjustable attenuator 64 can be controlled by gain controller 66. Gain controller 66 can be configured to detect receive gain control signals sent by communications processor 60 to amplifier 62. And based on the detected receive gain control signals, gain controller 66 can determine a supplemental attenuation control value. The supplemental attenuation control value can then be encoded in a signal that is sent to adjustable attenuator 64.

It may be possible, in some circumstances, for the signals transmitted along intra-consist cable 58 to spike in voltage to levels that are high enough to damage components of access point 46, before the signals can be sufficiently attenuated by adjustable attenuator 64 and/or amplifier 62. It may also be possible for the signals to spike to levels that are impossible to sufficiently attenuate with adjustable attenuator 64 and/or amplifier 62. For this reason, voltage clamp 68 may be connected to intra-consist cable 58 at a location upstream of adjustable attenuator 64. Voltage clamp 68 may be, for example, a diode clamp that is configured to conduct electric current in only one direction and prevent any signal passing therethrough from exceeding a reference value. In other words, voltage clamp 68 may clip off a portion of any signal exceeding the reference value. In the disclosed example, the reference value is about 5V, although other values may also be utilized. Accordingly, no signal having a strength greater than the reference value (e.g., about 5V) should ever be received by adjustable attenuator 64, amplifier 62, and communications processor 60.

Although helpful in protecting the components of access point 46 from damaging extremes, it may also be possible for voltage clamp 68 to cause signal deterioration. Specifically, when voltage clamp 68 clips off portions of the signal having a strength above 5V, it may not be possible for communications processor 60 to properly interpret and/or process the signal. That is, too much of the signal may have been removed for accurate interpretation of the signal.

Passive attenuator 70 may help to preserve the integrity of the signal, even when voltage clipping occurs before interpretation by communications processor 60. In particular, passive attenuator 70 may be configured to attenuate every signal received from intra-consist cable 58, before the signal passes through voltage clamp 68 and is clipped. In one example, passive attenuator 70 may attenuate each signal by about ⅓ to ½. In this manner, if a signal would normally be clipped by voltage clamp 68, passive attenuator 70 may reduce a strength of the signal such that less (if any) of the signal is subsequently clipped by voltage clamp 68. Accordingly, access point 46 may still be protected from extreme voltage spikes, and yet more of the signals received from intra-consist cable 58 may be properly interpreted by communications processor 60.

In some instances, the use of passive attenuator 70 may cause already weak signals to become even weaker. However, the use of amplifier 62 may help to raise the strength of these signals back up to desired levels that can be properly interpreted by communications processor 60.

Passive attenuator 70, in addition to preserving the integrity of signals received from intra-consist cable 58, may also help to isolate the signal receiving functionality of access point 46 from signal transmissions originating from the same access point 46. In particular, it may be possible for the same access point 46 to be simultaneously sending and receiving signals using the same intra-consist cable 58. And when this occurs, passive attenuator 70 may attenuate noise caused by the simultaneous transmission such that the signals being received have improved clarity.

It is contemplated that a single attenuator (not shown) could alternatively be used in place of adjustable attenuator 64 and passive attenuator 70, if desired. Specifically, the single attenuator could embody an adjustable attenuator located upstream of voltage clamp 68. In this position, the single attenuator could be controlled by communications processor 60 to provide a desired level of attenuation that lowers incoming signals (e.g., to below the threshold of voltage clamp 68) before it is received by voltage clamp 68. This single attenuator, however, would need to be tolerant of extreme voltage spikes possible in the signals being attenuated.

During transmission of signals from one access point 46 to another access point 46 via intra-consist cable 58, care should be taken to ensure that the signals have a strength required to reach the intended recipient and be accurately processed without overloading any portions of communication network 44. And the signal strength required to do this may change, depending on the current operating conditions of consist 10. These operating conditions may include, among other things, a configuration of consist 10 (e.g., a number of locomotives 12, a position of locomotives 12, a length and/or condition of intra-consist cable 58, etc.), the particular intended recipient component (e.g., a signal strength limit or minimum threshold of a particular component), and status of intra-consist cable 58 (e.g., current use of intra-consist cable 58 by other access points 46 and/or components 50, condition, impedance, etc.). In order to accommodate these different conditions, communications processor 60 may be configured to generate signals having different strengths, and direct the signals through transmitter amplifier 72, which selectively amplifies the different signals.

Communications processor 60 may include one or more different transmitter chips (not shown) that are configured to generate the different signals based on the conditions described above and one or more scale factor maps stored in memory. In the disclosed example, each transmitter chip may be associated with a different scale factor map. These maps may reference the particular configuration of consist 10 (e.g., a three locomotive compact configuration, a five locomotive spread apart configuration, etc.), the intended recipient (e.g., an access point 46 located at a furthest away locomotive 12 or an access point located at a nearby tender car 14), and/or the status of intra-consist cable 58 (e.g., a particular configuration of energized strands within intra-consist cable 58) with different amplitude scale factors that should be used by communications processor 60 to generate the signals. In this example, when the configuration of consist 10 changes, the intended recipient changes, and/or the status of intra-consist cable 58 varies, a different chip (and corresponding amplitude scale factor map) may be used by communications processor 60 to generate the signals. The switching between chips may be controlled by communications processor 60 and/or by another stand-along controller, as desired. In the disclosed example, transmitter amplifier 72 may then amplify the signals from communications processor 60 by about three times, up to about 12V.

In some applications, the pre-programmed maps of amplitude scale factors may not always produce signals have a desired strength. That is, there may be factors affecting signal transmission and receipt that cannot be accounted for perfectly with the different maps. In this situation, it may be possible to dynamically update the existing maps and/or create new maps that are unique to the current situation (i.e., the current consist configuration, current operating conditions, etc.). As will be described in more detail below, these maps may be tested and selectively stored in memory for subsequent use.

Transmitter amplifier 72, in addition to amplifying outgoing signals, may also act as a voltage clamp or attenuator. In particular, transmitter amplifier 72 may attenuate external signals to about ⅓ of their normal strength, thereby helping to protect communications processor 60 and/or other components of access point 46 from damaging voltage spikes.

Figure 4:
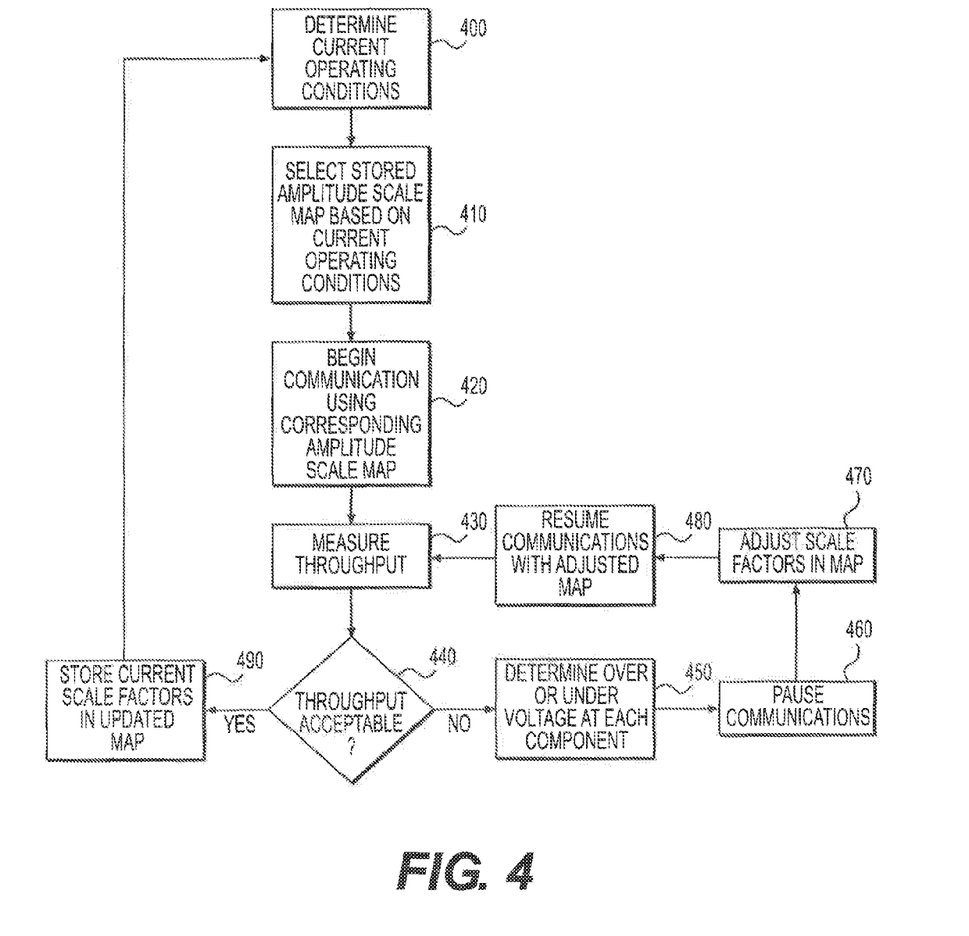
FIG. 4 is a flow chart illustrating an exemplary disclosed method for that can be performed by one or more components of FIG. 3.

FIG. 4 is a flowchart depicting an exemplary operation performed by communication network 44. FIG. 4 will be discussed in more detail below to further illustration the disclosed concepts.

INDUSTRIAL APPLICABILITY

The disclosed communication network can be applicable to any consist that includes a plurality of rail cars, such as locomotives and tender cars. The disclosed communication network may provide high quality signal transmission and receipt over a variety of different configurations and conditions, resulting in finer control over consist operation. An exemplary operation of communication network 44 will now be explained with respect to the flowchart of FIG. 4.

During operation of consist 10, communications processor 60 and transmission amplifier 72 may together perform the method of FIG. 4 to select and/or adjust particular amplitude scale factor maps used during signal transmission. Although the disclosure that follows describes the method as being performed by communications processor 60 and transmission amplifier 72, either one of these components alone and/or together, with or without other components of access point 46, can perform one or more of the steps of the method, as desired.

The method of FIG. 4 may begin with communications processor 60 determining the current operating conditions of consist 10 (Step 400). These operating conditions, as described above, may include, among other things, the current configuration of consist 10, the status of intra-consist cable 58, and/or the intended recipient component. Based on the current operating conditions of consist 10, communications processor 60 may then select from any number of stored maps a particular amplitude scale factor map corresponding to the current operating conditions (Step 410). In the disclosed example, communications processor 60 may have two different maps stored in memory and associated with two different transmitter chips. It is contemplated, however, that a greater number of maps may be stored in memory and associated with any number of transmitter chips (e.g., only one transmitter chip).

After the appropriate amplitude scale factor map has been selected, communications processor 60 may begin signal transmission using the corresponding map (Step 420). In particular, communications processor 60 may generate a signal intended for a particular recipient component at another access point 46, scale the signal based on values stored within the selected map, and then direct that signal to transmission amplifier 72. Transmission amplifier 72 may then amplify the voltage of the signal three fold. For example for a scaled signal of about 4V, transmission amplifier 72 may amplify the signal up to about 12V.

Communications processor 60 may then measure a throughput of the transmitted signal (Step 430) and determine if the measured throughput is acceptable (Step 440). In particular, communications processor 60 may estimate a strength of the transmitted signal and compare the estimated strength to an actual strength as received at the access point 46 of the intended recipient component. When a voltage of the transmitted signal is significantly different from the estimated voltage of the signal (i.e., different by at least a threshold amount), communications processor 60 may consider the particular amplitude scale factor map used to generate the signal as an inaccurate model of the communication network 44 and in need of update.

Communications processor 60 may then determine if the actual signal strength was over or under voltage (i.e., too strong or too weak) (Step 450). This determination can be made through comparison with the estimated signal voltage. Communications processor 60 may then pause communication (i.e., pause signal transmission from that particular access point 46) (Step 460), and adjust the scale factors stored in the map (Step 470). For example, if the signal was measured to be too weak, the scale factors in the map may be increased by a corresponding amount. And likewise, if the signal was measured to be too strong (i.e., such that it was clipped by the corresponding voltage clamp 68), communications processor 60 may instead reduce the scale factors in the map. Communications processor 60 may then resume communications using the adjusted map (Step 480), and control may return to step 430.

When at step 440, if communications processor 60 determines that the measured throughput is acceptable, communications processor 60 may store the current scale factors in the updated map for future use (Step 490). Control may return from step 490 to step 400.

When signals are transmitted to a particular access point, the signals may first be attenuated by passive attenuator 70 (see FIG. 3), before passing through voltage clamp 68. For example, a signal having a strength of about 8 volts may be attenuated down to about 5.5V within passive attenuator 70, before being clipped to about 5V within voltage clamp 68. In another example, a signal having a strength of about 0.1 volts may be attenuated down to about 0.07 volts within passive attenuator 70 and not clipped at all within voltage clamp 68.

The attenuated and/or clipped signals may then pass through adjustable attenuator 64. And based on control signals from communications processor 60, gain controller 66 may selectively attenuate the signal(s) further. In the first example, the signal may be further attenuated from about 5V down to about 3V. In the second example, the signal may not be attenuated any further. The signals may then pass through amplifier 62, where only the second exemplary signal is amplified up to about 3V, which in these examples, is a desired voltage level at which communications processor 60 may properly interpret and/or process the signals.

Several advantages may be associated with the disclosed communication network. Specifically, the use of passive attenuator 70 (in combination with voltage clamp 68, adjustable attenuator 64, and amplifier 62) may enhance the capability of communication network 44 to protect components of each access point 46 from damaging voltage spikes, without causing significant signal deterioration. Further, noise within received signals at a particular access point 46 that are caused by transmission from the same access point 46 may be reduced through isolation provided by passive attenuator 70. In addition, the increased supply voltage (12V) and amplification power (3×) of transmission amplifier 72 may improve long-distance communication, while at the same time protecting communications processor 60 from external signals through attenuation (⅓). Further, the increased threshold (5V) at which voltage clamp 68 clips incoming signals may allow for a greater amount of the signals to pass through to communications processor 60, while still protecting communications processor 60 from damaging pressure spikes. And finally, the ability to use multiple amplitude scale factor maps and/or to update the map(s), may allow for improved signal transmission.

It will be apparent to those skilled in the art that various modifications and variations can be made to the disclosed communication network without departing from the scope of the disclosure. Other embodiments of the communication network will be apparent to those skilled in the art from consideration of the specification and practice of the communication network disclosed herein. It is intended that the specification and examples be considered as exemplary only, with a true scope being indicated by the following claims and their equivalents.

What is claimed is:

1. An access point for a communication network, comprising:
   a communications processor that receives signals from a different access point of the communication network;
   at least a first attenuator that receives and selectively attenuates the signals before they are received by the communications processor;
   a voltage clamp that receives and limits a strength of the signals before they are received by the at least a first attenuator; and
   a second attenuator that receives and attenuates all signals before they are received by the voltage clamp.

2. The access point of claim 1, wherein the at least a first attenuator includes:
   an analog front end amplifier; and
   an adjustable attenuator located upstream of the analog front end amplifier.

3. The access point of claim 2, wherein the analog front end amplifier is configured to selectively attenuate the signals based on commands from the communications processor.

4. The access point of claim 3, further including a gain controller in communication with the adjustable attenuator and configured to selectively adjust an amount of attenuation provided by the adjustable attenuator.

5. The access point of claim 4, wherein:
the gain controller is configured to intercept the commands from the communications processor to the analog front end amplifier; and
the gain controller is configured to selectively adjust the amount of attenuation provided by the adjustable attenuator based on the commands.

6. The access point of claim 5, wherein the adjustable attenuator is configured to adjust the signals to a desired voltage level that is reliably interpreted by the communications processor.

7. The access point of claim 6, wherein the desired voltage level is about 3V.

8. The access point of claim 7, wherein the voltage clamp is configured to limit the signals to a maximum of about 5V.

9. The access point of claim 8, wherein the second attenuator is a passive attenuator configured to attenuate all signals by about ⅓ to ½.

10. The access point of claim 1, further including a cable configured to conduct the signals to the communications processor of the access point and outgoing signals from the communications processor to the different access point, wherein the second attenuator is located downstream of a point at which the outgoing signals generated by the communications processor are directed onto the cable.

11. The access point of claim 10, wherein the second attenuator is configured to isolate the voltage clamp, the at least a first attenuator, and the communications processor from the outgoing signals directed by the communications processor onto the cable.

12. A communication network, comprising:
a first access point having a first communications processor, at least a first attenuator, a first voltage clamp, and a second attenuator;
a second access point having a second communications processor, at least a third attenuator, a second voltage clamp, and a fourth attenuator; and
a cable connecting the first and second access points, wherein:
the at least a first attenuator and the at least a third attenuator are connected to the cable at locations between the first and second communications processors;
the first and second voltage clamps are connected to the cable at locations between the at least a first and at least a third attenuators; and
the second and fourth attenuators are connected to the cable at locations between the at least a first and at least a third attenuators.

13. The communication network of claim 12, wherein the at least a first attenuator and the at least a third attenuator each includes:
an analog front end amplifier configured to selectively attenuate signals based on commands from the corresponding one of the first and second communications processors; and
an adjustable attenuator located upstream of the analog front end amplifier.

14. The communication network of claim 13, further including a gain controller in communication with the adjustable attenuator and configured to selectively adjust an amount of attenuation provided by the adjustable attenuator.

15. The communication network of claim 14, wherein:
the gain controller is configured to intercept the commands from the corresponding one of the first and second communications processors to the analog front end amplifier; and
the gain controller is configured to selectively adjust the amount of attenuation provided by the adjustable attenuator based on the commands.

16. The communication network of claim 15, wherein the adjustable attenuator is configured to adjust the signals to a desired voltage level of about 3V.

17. The communication network of claim 16, wherein the first and second voltage clamps are configured to limit the signals to a maximum of about 5V.

18. The communication network of claim 17, wherein the second attenuator is a passive attenuator configured to attenuate all signals by about ⅓ to ½.

19. The communication network of claim 12, wherein the second and fourth attenuators are configured to isolate the first and second voltage clamps, the at least a first attenuator, the at least a third attenuator, the first communications processor, and the second communications processor from outgoing signals.

20. A train consist, comprising:
a first locomotive;
a second locomotive;
a tender car;
a first access point located on the first locomotive and being configured to control operations of the first locomotive;
a second access point located on one of the second locomotive and the tender car and being configured to control operations of the one of the second locomotive and the tender car; and
a cable connecting the first and second access points to communicate signals associated with coordinated control over operations of the first locomotive, the tender car, and/or the second locomotive,
wherein each of the first and second access points includes:
a communications processor configured to receive signals;
an analog front end amplifier located to receive and selectively attenuate the signals before the signals are received by the communications processor;
an adjustable attenuator located to receive and selectively attenuate the signals to about 3V before the signals are received by the analog front end amplifier;
a gain controller configured to affect adjustment of the adjustable attenuator;
a voltage clamp configured to selectively limit a strength of the signals to about 5V before the signals are received by the adjustable attenuator; and
a passive attenuator configured to attenuate all signals by about ⅓ to ½ before the signals are received by the voltage clamp.

* * * * *